United States Patent
Maeda

(10) Patent No.: US 12,080,892 B2
(45) Date of Patent: Sep. 3, 2024

(54) BINDER COMPOSITION FOR ALL-SOLID-STATE SECONDARY BATTERY, SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

(71) Applicant: ZEON CORPORATION, Tokyo (JP)

(72) Inventor: Kouichirou Maeda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 620 days.

(21) Appl. No.: 17/279,207

(22) PCT Filed: Sep. 20, 2019

(86) PCT No.: PCT/JP2019/037129
§ 371 (c)(1),
(2) Date: Mar. 24, 2021

(87) PCT Pub. No.: WO2020/066951
PCT Pub. Date: Apr. 2, 2020

(65) Prior Publication Data
US 2022/0037664 A1     Feb. 3, 2022

(30) Foreign Application Priority Data

Sep. 28, 2018   (JP) ................. 2018-185734

(51) Int. Cl.
| | |
|---|---|
| H01M 4/62 | (2006.01) |
| H01M 4/02 | (2006.01) |
| H01M 4/52 | (2010.01) |
| H01M 4/587 | (2010.01) |
| H01M 10/0562 | (2010.01) |

(52) U.S. Cl.
CPC ....... *H01M 4/622* (2013.01); *H01M 10/0562* (2013.01); *H01M 2004/027* (2013.01); *H01M 2004/028* (2013.01); *H01M 4/52* (2013.01); *H01M 4/587* (2013.01); *H01M 4/625* (2013.01); *H01M 2300/008* (2013.01)

(58) Field of Classification Search
CPC .................. H01M 4/622; H01M 10/0562
See application file for complete search history.

(56) References Cited

U.S. PATENT DOCUMENTS

| | | | |
|---|---|---|---|
| 11,239,490 B2 | 2/2022 | Matsumura | |
| 11,742,487 B2 * | 8/2023 | Otsuka ...................... | C08L 9/02 429/217 |
| 2015/0337127 A1 * | 11/2015 | Nakaya ................... | C08L 33/14 524/833 |
| 2018/0062162 A1 * | 3/2018 | Maeda .................. | H01M 4/625 |

FOREIGN PATENT DOCUMENTS

| | | |
|---|---|---|
| JP | 2012243476 A | 12/2012 |
| JP | 2013143299 A | 7/2013 |
| JP | 2014056813 A | 3/2014 |
| JP | 2016046226 A | 4/2016 |
| JP | 2016143614 A | 8/2016 |
| JP | 2016181471 A | 10/2016 |
| WO | 2016080145 A1 | 5/2016 |
| WO | 2016152262 A1 | 9/2016 |
| WO | 2018079783 A1 | 5/2018 |
| WO | 2018079786 A1 | 5/2018 |

OTHER PUBLICATIONS

May 27, 2022, the Extended European Search Report issued by the European Patent Office in the corresponding European Patent Application No. 19867788.2.
Mar. 23, 2021, International Preliminary Report on Patentability issued in the International Patent Application No. PCT/JP2019/037129.

* cited by examiner

*Primary Examiner* — Karie O'Neill Apicella
(74) *Attorney, Agent, or Firm* — KENJA IP LAW PC

(57) ABSTRACT

Provided is a binder composition for an all-solid-state secondary battery with which it is possible to form a solid electrolyte-containing layer that can cause an all-solid-state secondary battery to display excellent high-temperature storage characteristics. The binder composition for an all-solid-state secondary battery contains an acrylic polymer and not less than 500 mass ppm and not more than 5,000 mass ppm of a coagulant relative to the acrylic polymer.

9 Claims, No Drawings

BINDER COMPOSITION FOR ALL-SOLID-STATE SECONDARY BATTERY, SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

TECHNICAL FIELD

The present disclosure relates to a binder composition for an all-solid-state secondary battery, a slurry composition for an all-solid-state secondary battery, a solid electrolyte-containing layer, and an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

For this reason, all-solid-state secondary batteries in which a solid electrolyte is used instead of an organic solvent electrolyte having high flammability and high danger of ignition upon leakage are attracting attention as secondary batteries having high safety.

An all-solid-state secondary battery includes a positive electrode, a negative electrode, and a solid electrolyte layer located between the positive electrode and the negative electrode. An electrode (positive electrode or negative electrode) of an all-solid-state secondary battery is formed by, for example, applying a slurry composition that contains an electrode active material (positive electrode active material or negative electrode active material), a binder, and a solid electrolyte onto a current collector, and then drying the slurry composition that has been applied to provide an electrode mixed material layer (positive electrode mixed material layer or negative electrode mixed material layer) on the current collector. Moreover, a solid electrolyte layer of an all-solid-state secondary battery is formed by, for example, applying a slurry composition that contains a binder and a solid electrolyte onto an electrode or a releasable substrate, and then drying the slurry composition that has been applied.

Acrylic polymers are conventionally used as binders in the formation of solid electrolyte layers. For example, in Patent Literature (PTL) 1, monomers are emulsion polymerized in water in the presence of sodium dodecylbenzenesulfonate as an emulsifier to obtain a water dispersion of an acrylic polymer, and then solvent exchange with an organic solvent is performed to produce a binder composition that contains the acrylic polymer and the organic solvent.

CITATION LIST

Patent Literature

PTL 1: WO2016/152262A1

SUMMARY

Technical Problem

Particularly in recent years, inhibiting capacity reduction of all-solid-state secondary batteries under high-temperature conditions (i.e., enhancing high-temperature storage characteristics) has been an issue due to all-solid-state secondary batteries often being exposed to high-temperature conditions (for example, 80° C. or higher) in fields such as electric vehicles, for example. In other words, there is demand for forming a layer that contains a solid electrolyte (hereinafter, referred to as a "solid electrolyte-containing layer") such as a solid electrolyte layer or an electrode mixed material layer and ensuring adequate high-temperature storage characteristics of an all-solid-state secondary battery using a binder composition that contains an acrylic polymer.

Accordingly, one object of the present disclosure is to provide a binder composition for an all-solid-state secondary battery and a slurry composition for an all-solid-state secondary battery with which it is possible to form a solid electrolyte-containing layer that can cause an all-solid-state secondary battery to display excellent high-temperature storage characteristics.

Another object of the present disclosure is to provide a solid electrolyte-containing layer that can cause an all-solid-state secondary battery to display excellent high-temperature storage characteristics and an all-solid-state secondary battery that has excellent high-temperature storage characteristics.

Solution to Problem

The inventor conducted diligent investigation with the aim of solving the problem set forth above. The inventor reached a new discovery that a solid electrolyte-containing layer that can cause an all-solid-state secondary battery to display excellent high-temperature storage characteristics can be formed by using a slurry composition that is produced using a binder composition containing an acrylic polymer and a specific amount of a coagulant, and, in this manner, the inventor completed the present disclosure.

Specifically, the present disclosure aims to advantageously solve the problem set forth above, and a presently disclosed binder composition for an all-solid-state secondary battery comprises: an acrylic polymer; and not less than 500 mass ppm and not more than 5,000 mass ppm of a coagulant relative to the acrylic polymer. By forming a solid electrolyte-containing layer using a slurry composition containing a binder composition that contains an acrylic polymer and a coagulant and in which the amount of the coagulant relative to the acrylic polymer is a proportion that is within the range set forth above in this manner, it is possible to cause an all-solid-state secondary battery to display excellent high-temperature storage characteristics.

Note that the term "acrylic polymer" as used in the present disclosure means a polymer that includes a (meth)acrylic acid ester monomer unit in a proportion of 50 mass % or more.

Also note that in the present disclosure, "(meth)acryl" is used to indicate "acryl" and/or "methacryl".

Moreover, the phrase "includes a monomer unit" as used in the present disclosure means that "a polymer obtained using the monomer includes a repeating unit derived from the monomer".

Furthermore, the proportion in which each repeating unit (monomer unit) of a polymer is included in the polymer can be measured by a nuclear magnetic resonance (NMR) method such as $^{1}$H-NMR or $^{13}$C-NMR.

Also, the term "coagulant" as used in the present disclosure refers to a substance that is added in order to cause aggregation and coagulation of an acrylic polymer present in a dispersed state in water and that instantly causes irreversible coagulation of particles of an acrylic polymer dispersed in water in a normal temperature region (for example, 15° C. to 30° C.).

Note that the content of a "coagulant" relative to an "acrylic polymer" referred to in the present disclosure can be determined by elemental analysis.

In the presently disclosed binder composition for an all-solid-state secondary battery, the coagulant is preferably a metal sulfate having a valence of not less than 1 and not more than 3. By using a metal sulfate having a valence of not less than 1 and not more than 3 as the coagulant, production efficiency of the binder composition can be ensured while also sufficiently improving high-temperature storage characteristics of an all-solid-state secondary battery.

In the presently disclosed binder composition for an all-solid-state secondary battery, an emulsion polymer can be used as the acrylic polymer.

Also, the presently disclosed binder composition for an all-solid-state secondary battery can further comprise an organic solvent.

Moreover, the present disclosure aims to advantageously solve the problem set forth above, and a presently disclosed slurry composition for an all-solid-state secondary battery comprises: a solid electrolyte; and the above-described binder composition for an all-solid-state secondary battery that contains an organic solvent. By forming a solid electrolyte-containing layer using a slurry composition that contains a solid electrolyte and the binder composition containing an organic solvent in this manner, it is possible to cause an all-solid-state secondary battery to display excellent high-temperature storage characteristics.

The presently disclosed slurry composition for an all-solid-state secondary battery can contain an inorganic solid electrolyte as the solid electrolyte.

Also, the presently disclosed slurry composition for an all-solid-state secondary battery can further comprise an electrode active material. An electrode mixed material layer that can cause an all-solid-state secondary battery to display excellent high-temperature storage characteristics can be well formed by using the slurry composition for an all-solid-state secondary battery that contains an electrode active material.

Furthermore, the present disclosure aims to advantageously solve the problem set forth above, and a presently disclosed solid electrolyte-containing layer is formed using any one of the slurry compositions for an all-solid-state secondary battery set forth above. The solid electrolyte-containing layer formed using the slurry composition for an all-solid-state secondary battery set forth above can cause an all-solid-state secondary battery to display excellent high-temperature storage characteristics.

Also, the present disclosure aims to advantageously solve the problem set forth above, and a presently disclosed all-solid-state secondary battery comprises the solid electrolyte-containing layer set forth above. An all-solid-state secondary battery that can display excellent high-temperature storage characteristics is obtained by using the solid electrolyte-containing layer set forth above.

Advantageous Effect

According to the present disclosure, it is possible to provide a binder composition for an all-solid-state secondary battery and a slurry composition for an all-solid-state secondary battery with which it is possible to form a solid electrolyte-containing layer that can cause an all-solid-state secondary battery to display excellent high-temperature storage characteristics.

Moreover, according to the present disclosure, it is possible to provide a solid electrolyte-containing layer that can cause an all-solid-state secondary battery to display excellent high-temperature storage characteristics and an all-solid-state secondary battery that has excellent high-temperature storage characteristics.

DETAILED DESCRIPTION

The following provides a detailed description of embodiments of the present disclosure.

The presently disclosed binder composition for an all-solid-state secondary battery is used in production of the presently disclosed slurry composition for an all-solid-state secondary battery. Moreover, the presently disclosed slurry composition for an all-solid-state secondary battery is used in formation of a solid electrolyte-containing layer, such as an electrode mixed material layer or a solid electrolyte layer, that is used in an all-solid-state secondary battery, such as an all-solid-state lithium ion secondary battery. Furthermore, the presently disclosed all-solid-state secondary battery is an all-solid-state secondary battery in which at least one layer selected from the group consisting of a positive electrode mixed material layer of a positive electrode, a negative electrode mixed material layer of a negative electrode, and a solid electrolyte layer is the presently disclosed solid electrolyte-containing layer formed using the presently disclosed slurry composition for an all-solid-state secondary battery.

(Binder Composition for all-Solid-State Secondary Battery)

The presently disclosed binder composition contains an acrylic polymer and a coagulant, and can optionally further contain other components such as an organic solvent. The content of the coagulant in the presently disclosed binder composition is required to be not less than 500 mass ppm and not more than 5,000 mass ppm relative to the acrylic polymer.

Through a slurry composition produced using the presently disclosed binder composition, it is possible to form a solid electrolyte-containing layer that can cause an all-solid-state secondary battery to display excellent high-temperature storage characteristics.

<Acrylic Polymer>

The acrylic polymer is a component that functions as a binder in a solid electrolyte-containing layer that is formed from a slurry composition containing the binder composition. Note that the presently disclosed binder composition may include one acrylic polymer or may include two or more acrylic polymers.

<<Chemical Composition>>

The acrylic polymer is a polymer that includes a (meth)acrylic acid ester monomer unit as a repeating unit in a proportion of 50 mass % or more as previously described. Note that the acrylic polymer may include repeating units other than the (meth)acrylic acid ester monomer unit (hereinafter, referred to as "other repeating units").

[(Meth)Acrylic Acid Ester Monomer Unit]

Examples of (meth)acrylic acid ester monomers that can form the (meth)acrylic acid ester monomer unit include, but are not specifically limited to, (meth)acrylic acid alkyl ester monomers and (meth)acrylic acid alkoxyalkyl ester monomers. Note that one (meth)acrylic acid ester monomer may be used individually, or two or more (meth)acrylic acid ester monomers may be used in combination.

Although no specific limitations are placed on (meth)acrylic acid alkyl ester monomers that can be used, an ester of (meth)acrylic acid and an alkanol having a carbon number of not less than 1 and not more than 8 is preferable. Specific examples include methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, 2-ethylhexyl (meth)acrylate, and cyclohexyl (meth)acrylate. One of these (meth)acrylic acid alkyl ester monomers may be used individually, or two or more of these (meth)acrylic acid alkyl ester monomers may be used in combination. Of these (meth)acrylic acid alkyl ester monomers, ethyl (meth)acrylate and n-butyl (meth)acrylate are preferable from a viewpoint of sufficiently improving high-temperature storage characteristics of an all-solid-state secondary battery, with ethyl acrylate and n-butyl acrylate being more preferable.

Although no specific limitations are placed on (meth)acrylic acid alkoxyalkyl ester monomers that can be used, an ester of (meth)acrylic acid and an alkoxyalkyl alcohol having a carbon number of not less than 2 and not more than 8 is preferable. Specific examples include methoxymethyl (meth)acrylate, ethoxymethyl (meth)acrylate, 2-methoxyethyl (meth)acrylate, 2-ethoxyethyl (meth)acrylate, 2-propoxyethyl (meth)acrylate, 2-butoxyethyl (meth)acrylate, 3-methoxypropyl (meth)acrylate, and 4-methoxybutyl (meth)acrylate. One of these (meth)acrylic acid alkoxyalkyl ester monomers may be used individually, or two or more of these (meth)acrylic acid alkoxyalkyl ester monomers may be used in combination. Of these (meth)acrylic acid alkoxyalkyl ester monomers, 2-ethoxyethyl (meth)acrylate and 2-methoxyethyl (meth)acrylate are preferable from a viewpoint of sufficiently improving high-temperature storage characteristics of an all-solid-state secondary battery, with 2-ethoxyethyl acrylate and 2-methoxyethyl acrylate being particularly preferable.

The proportional content of the (meth)acrylic acid ester monomer unit in the acrylic polymer is required to be 50 mass % or more from a viewpoint of ensuring binding capacity of the acrylic polymer, and is preferably 60 mass % or more, and more preferably 70 mass % or more. On the other hand, the upper limit for the proportional content of the (meth)acrylic acid ester monomer unit in the acrylic polymer is not specifically limited, and the proportional content of the (meth)acrylic acid ester monomer unit can be 100 mass % or less.

The acrylic polymer is preferably a polymer that includes a (meth)acrylic acid alkyl ester monomer unit as a (meth)acrylic acid ester monomer unit in a proportion of not less than 30 mass % and not more than 100 mass % from a viewpoint of sufficiently improving high-temperature storage characteristics of an all-solid-state secondary battery.

Moreover, the acrylic polymer preferably includes both an ethyl acrylate unit and an n-butyl acrylate unit from a viewpoint of sufficiently improving high-temperature storage characteristics of an all-solid-state secondary battery.

[Other Repeating Units]

No specific limitations are placed on other repeating units so long as they are repeating units derived from monomers that are copolymerizable with a (meth)acrylic acid ester monomer such as described above, and examples of other repeating units include an aromatic vinyl monomer unit, an $\alpha,\beta$-ethylenically unsaturated nitrile monomer unit, and an acrylamide monomer unit. Note that one monomer that can form another repeating unit may be used individually, or two or more monomers that can form other repeating units may be used in combination.

Examples of aromatic vinyl monomers that can form an aromatic vinyl monomer unit include styrene, $\alpha$-methylstyrene, and divinylbenzene. One of these aromatic vinyl monomers may be used individually, or two or more of these aromatic vinyl monomers may be used in combination.

Examples of $\alpha,\beta$-ethylenically unsaturated nitrile monomers that can form an $\alpha,\beta$-ethylenically unsaturated nitrile monomer unit include acrylonitrile and methacrylonitrile. One of these $\alpha,\beta$-ethylenically unsaturated nitrile monomers may be used individually, or two or more of these $\alpha,\beta$-ethylenically unsaturated nitrile monomers may be used in combination.

Examples of acrylamide monomers that can form an acrylamide monomer unit include acrylamide and methacrylamide. One of these acrylamide monomers may be used individually, or two or more of these acrylamide monomers may be used in combination.

Besides the aromatic vinyl monomers, $\alpha,\beta$-ethylenically unsaturated nitrile monomers, and acrylamide monomers described above, olefinic monomers such as ethylene, vinyl acetate, propylene, butadiene, and isoprene can also be used to form other repeating units.

Of these examples, styrene, acrylonitrile, methacrylonitrile, ethylene, and vinyl acetate are preferable as monomers that can form other repeating units, and acrylonitrile, methacrylonitrile, and ethylene are more preferable as monomers that can form other repeating units.

The proportional content of other repeating units in the acrylic polymer is 50 mass % or less, preferably 40 mass % or less, and more preferably 30 mass % or less.

<<Production Method>>

Although no specific limitations are placed on the method by which the acrylic polymer is produced through polymerization of the monomers described above, it is preferable that the acrylic polymer is produced by emulsion polymerization described further below in the "Production method of binder composition" section. In other words, the acrylic polymer is preferably a polymer produced by emulsion polymerization (i.e., an emulsion polymer).

<Coagulant>

As previously described, the coagulant is a substance that can cause aggregation and coagulation of an acrylic polymer present in a dispersed form in water. Although no specific limitations are made in the present disclosure, the coagulant is normally added in order to cause coagulation of the acrylic polymer in a water dispersion (for example, an emulsion polymerization liquid) obtained through a polymerization reaction in water and normally remains in the binder composition.

<<Type>>

The coagulant is not specifically limited and may, for example, be a metal salt having a valence of not less than 1 and not more than 3. The metal salt having a valence of not less than 1 and not more than 3 is a salt including a metal that forms a metal ion having a valence of not less than 1 and not more than 3 when the salt is dissolved in water. For example, the metal salt may be a salt of an inorganic acid selected from hydrochloric acid, nitric acid, sulfuric acid, and the like or an organic acid such as acetic acid with a metal selected from sodium, potassium, lithium, magnesium, calcium, zinc, titanium, manganese, iron, cobalt, nickel, aluminum, tin, and the like, without any specific limitations. Moreover, a hydroxide of any of these metals, or the like, can be used.

Specific examples of the metal salt having a valence of not less than 1 and not more than 3 include metal chlorides such as sodium chloride, potassium chloride, lithium chloride, magnesium chloride, calcium chloride, zinc chloride, titanium chloride, manganese chloride, iron chloride, cobalt chloride, nickel chloride, aluminum chloride, and tin chloride; metal nitrates such as sodium nitrate, potassium nitrate, lithium nitrate, magnesium nitrate, calcium nitrate, zinc nitrate, titanium nitrate, manganese nitrate, iron nitrate, cobalt nitrate, nickel nitrate, aluminum nitrate, and tin nitrate; and metal sulfates such as sodium sulfate, potassium sulfate, lithium sulfate, magnesium sulfate, calcium sulfate, zinc sulfate, titanium sulfate, manganese sulfate, iron sulfate, cobalt sulfate, nickel sulfate, aluminum sulfate, and tin sulfate. Of these metal salts, calcium chloride, sodium chloride, magnesium chloride, zinc chloride, and metal sulfates are preferable from a viewpoint of ensuring production efficiency of the binder composition while also sufficiently improving high-temperature storage characteristics of an all-solid-state secondary battery, with metal sulfates being more preferable, and sodium sulfate and magnesium sulfate even more preferable. Note that one of these metal salts may be used individually, or a plurality of these metal salts may be used in combination.

<<Content>>

The content of the coagulant contained in the presently disclosed binder composition is required to be not less than 500 mass ppm and not more than 5,000 mass ppm relative to the acrylic polymer, is preferably 800 mass ppm or more, and is preferably 4,500 mass ppm or less, more preferably 4,000 mass ppm or less, and even more preferably 3,500 mass ppm or less.

The coagulant is normally added in order to cause coagulation of the acrylic polymer in a water dispersion obtained through a polymerization reaction in water as previously described, and, in this case, the coagulant unavoidably remains in the obtained binder composition (particularly in the acrylic polymer). The inventor has revealed that adequate high-temperature storage characteristics of an all-solid-state secondary battery cannot be ensured when the amount of this coagulant is excessively large. In other words, it is not possible to cause an all-solid-state secondary battery to display excellent high-temperature storage characteristics when the content of the coagulant contained in the binder composition is more than 5,000 mass ppm relative to the acrylic polymer. On the other hand, when the additive amount of the coagulant used to cause coagulation of the acrylic polymer in the water dispersion is reduced or excessive washing of the acrylic polymer is performed after coagulation with the aim of reducing the amount of the coagulant, production efficiency of the binder composition is lost due to the recovery rate of the acrylic polymer excessively decreasing or production steps becoming complicated, for example. From this viewpoint, the content of the coagulant contained in the binder composition is required to be 500 mass ppm or more.

Note that the content (residual amount) of the coagulant in the binder composition can be adjusted by altering the type of emulsifier used in production of the acrylic polymer, the additive amount of the coagulant that is added to the water dispersion of the acrylic polymer, and the washing conditions of the acrylic polymer (binder composition) after coagulation.

<<Other Components>>

No specific limitations are placed on components other than the acrylic polymer and the coagulant described above that can optionally be contained in the binder composition.

For example, the binder composition can contain an organic solvent as another component. Examples of organic solvents that can be used include chain aliphatic hydrocarbons such as hexane; cyclic aliphatic hydrocarbons such as cyclopentane and cyclohexane; aromatic hydrocarbons such as toluene and xylene; ketones such as ethyl methyl ketone, cyclohexanone, and diisobutyl ketone; esters such as ethyl acetate, butyl acetate, γ-butyrolactone, and ε-caprolactone; acylonitriles such as acetonitrile and propionitrile; ethers such as tetrahydrofuran, ethylene glycol diethyl ether, and n-butyl ether; alcohols such as methanol, ethanol, isopropanol, ethylene glycol, and ethylene glycol monomethyl ether; and amides such as N-methylpyrrolidone and N,N-dimethylformamide.

Of these examples, a non-polar organic solvent is preferably used as the organic solvent from a viewpoint of inhibiting degradation of a solid electrolyte and obtaining a solid electrolyte-containing layer having excellent ion conductivity, with the use of hexane or xylene as the organic solvent being more preferable. Moreover, xylene is particularly preferable from a viewpoint of further improving high-temperature storage characteristics of an all-solid-state secondary battery.

One of the organic solvents described above may be used individually, or two or more of the organic solvents described above may be used as a mixture.

Moreover, a component used in production of the acrylic polymer described further below in the "Production method of binder composition" section may remain in the binder composition as another component, and any of the optional components described further below in the "Slurry composition for all-solid-state secondary battery" section may be added to the binder composition as another component.

<Production Method of Binder Composition>

Although no specific limitations are placed on the method by which the presently disclosed binder composition set forth above is produced, the presently disclosed binder composition is preferably produced, for example, through steps of:

emulsion polymerizing monomer including a (meth) acrylic acid ester monomer in the presence of an emulsifier to obtain an emulsion polymerization liquid containing an acrylic polymer (emulsion polymerization step);

adding a coagulant to the emulsion polymerization liquid to cause coagulation of the acrylic polymer and obtain hydrous crumbs (coagulation step);

washing the hydrous crumbs (washing step); and drying the hydrous crumbs after the washing (drying step).

Note that the method of producing the binder composition through the emulsion polymerization step, the coagulation step, the washing step, and the drying step described above may include steps other than the emulsion polymerization step, the coagulation step, the washing step, and the drying step (hereinafter, referred to as "other steps").

<<Emulsion Polymerization Step>>

In the emulsion polymerization step, monomer such as the (meth)acrylic acid ester monomer described above is emulsion polymerized in the presence of an emulsifier to obtain an emulsion polymerization liquid that contains an acrylic polymer (water dispersion of acrylic polymer). The emulsion polymerization method in the emulsion polymerization step can be any method using an emulsifier, a polymerization initiator, a polymerization inhibitor, and so forth, for example, without any specific limitations, so long as monomer such as the (meth)acrylic acid ester monomer can be polymerized.

A non-ionic emulsifier, an anionic emulsifier, or a cationic emulsifier can be used as the emulsifier without any specific limitations.

Examples of non-ionic emulsifiers include polyoxyethylene alkyl ethers such as polyoxyethylene dodecyl ether, polyoxyethylene alkylphenol ethers such as polyoxyethylene nonylphenyl ether, polyoxyethylene alkyl esters, polyoxyethylene sorbitan alkyl esters, polyoxyethylene polyoxypropylene glycol, and polyethylene glycol monostearate.

Examples of anionic emulsifiers include salts of fatty acids such as myristic acid, palmitic acid, oleic acid, and linolenic acid, alkylbenzene sulfonic acid salts such as sodium dodecylbenzenesulfonate, higher alcohol sulfuric acid ester salts such as sodium lauryl sulfate, higher phosphoric acid ester salts such as sodium alkyl phosphates, and alkyl sulfosuccinate salts.

Examples of cationic emulsifiers include alkyl trimethyl ammonium chloride, dialkyl ammonium chloride, and benzyl ammonium chloride.

One of these emulsifiers may be used individually, or two or more of these emulsifiers may be used in combination. Of these emulsifiers, non-ionic emulsifiers and anionic emulsifiers are preferable, and combinations of a non-ionic emulsifier and an anionic emulsifier are more preferable. By using a combination of a non-ionic emulsifier and an anionic emulsifier, it is possible to effectively inhibit staining of a polymerization apparatus (for example, a polymerization tank) used in emulsion polymerization due to attachment of the acrylic polymer while also reducing the amount of coagulant that is used in the subsequently described coagulation step, which makes it possible to reduce the amount of the coagulant in the finally obtained binder composition (acrylic polymer).

Moreover, by using a non-ionic emulsifier and an anionic emulsifier in combination, it is possible to reduce the used amount of the emulsifier itself because emulsifying function of the emulsifier can be enhanced. Consequently, it is possible to reduce the residual amount of the emulsifier contained in the finally obtained binder composition (acrylic polymer), which can increase water resistance of the obtained acrylic polymer.

The amount of the emulsifier that is used, in terms of the total amount of the emulsifier that is used per 100 parts by mass of all monomer used in polymerization, is preferably not less than 0.1 parts by mass and not more than 5 parts by mass, more preferably not less than 0.5 parts by mass and not more than 4 parts by mass, and even more preferably not less than 1 part by mass and not more than 3 parts by mass.

Moreover, in a case in which a non-ionic emulsifier and an anionic emulsifier are used in combination, the amount of the non-ionic emulsifier that is used per 100 parts by mass of all monomer used in polymerization is preferably not less than 0.1 parts by mass and not more than 4 parts by mass, more preferably not less than 0.2 parts by mass and not more than 3 parts by mass, and even more preferably not less than 0.5 parts by mass and not more than 2 parts by mass, and the amount of the anionic emulsifier that is used per 100 parts by mass of all monomer used in polymerization is preferably not less than 0.1 parts by mass and not more than 4 parts by mass, more preferably not less than 0.2 parts by mass and not more than 3 parts by mass, and even more preferably not less than 0.5 parts by mass and not more than 2 parts by mass. The ratio in which the non-ionic emulsifier and the anionic emulsifier are used, in terms of a mass ratio of non-ionic emulsifier/anionic emulsifier, is preferably 1/99 to 99/1, more preferably 10/90 to 80/20, and even more preferably 25/75 to 75/25.

Examples of polymerization initiators that can be used include azo compounds such as azobisisobutyronitrile; organic peroxides such as diisopropylbenzene hydroperoxide, cumene hydroperoxide, paramenthane hydroperoxide, and benzoyl peroxide; and inorganic peroxides such as potassium persulfate, sodium persulfate, and ammonium persulfate. One of these polymerization initiators may be used individually, or two or more of these polymerization initiators may be used in combination. The amount of the polymerization initiator that is used per 100 parts by mass of all monomer used in polymerization is preferably not less than 0.001 parts by mass and not more than 1.0 parts by mass.

Moreover, an organic peroxide or inorganic peroxide used as the polymerization initiator is preferably used in combination with a reducing agent as a redox polymerization initiator. Examples of reducing agents that can be used in combination include, but are not specifically limited to, compounds including a metal ion that is in a reduced state such as ferrous sulfate, hexamethylenediaminetetraacetic acid iron sodium salt, and copper naphthenate; ascorbic acid (salt) such as ascorbic acid, sodium ascorbate, and potassium ascorbate; erythorbic acid (salt) such as erythorbic acid, sodium erythorbate, and potassium erythorbate; saccharides; sulfinic acid salts such as sodium hydroxymethanesulfinate; sulfurous acid salts such as sodium sulfite, potassium sulfite, sodium hydrogen sulfite, aldehyde sodium hydrogen sulfite, and potassium hydrogen sulfite; pyrosulfurous acid salts such as sodium pyrosulfite, potassium pyrosulfite, sodium hydrogen pyrosulfite, and potassium hydrogen pyrosulfite; thiosulfuric acid salts such as sodium thiosulfate and potassium thiosulfate; phosphorous acid (salt) such as phosphorous acid, sodium phosphite, potassium phosphite, sodium hydrogen phosphite, and potassium hydrogen phosphite; pyrophosphorous acid (salt) such as pyrophosphorous acid, sodium pyrophosphite, potassium pyrophosphite, sodium hydrogen pyrophosphite, and potassium hydrogen pyrophosphite; and sodium formaldehyde sulfoxylate. One of these reducing agents may be used individually, or two or more of these reducing agents may be used in combination. The amount of the reducing agent that is used per 100 parts by mass of the polymerization initiator is preferably not less than 0.0003 parts by mass and not more than 0.4 parts by mass.

Note that in the present disclosure, "acid (salt)" is used to mean an acid and/or a salt of that acid.

Examples of polymerization inhibitors that can be used include hydroxylamine, hydroxylamine sulfate, diethylhydroxylamine, hydroxylamine sulfonic acid and alkali metal salts thereof, sodium dimethyldithiocarbamate, and hydroquinone. The amount of the polymerization inhibitor that is used is not specifically limited but is preferably not less than 0.1 parts by mass and not more than 2 parts by mass per 100 parts by mass of all monomer used in polymerization.

The amount of water that is used is not specifically limited but is preferably not less than 80 parts by mass and not more than 500 parts by mass, and more preferably not less than 100 parts by mass and not more than 300 parts by mass per 100 parts by mass of all monomer used in polymerization.

Note that a polymerization auxiliary material such as a molecular weight modifier, a particle diameter modifier, a chelating agent, or an oxygen scavenger can be used in the emulsion polymerization as necessary. Known examples of these polymerization auxiliary materials can be used.

The emulsion polymerization can be performed by a batch method, a semi-batch method, or a continuous method, but is preferably performed by a semi-batch method. Specifically, it is preferable to adopt a method in which a polymerization reaction is performed while continuously adding at least one of monomer used in polymerization, a polymerization initiator, and a reducing agent to the polymerization reaction system in a dropwise manner from the start of the polymerization reaction until a freely selected period of time has elapsed, such as a method in which a polymerization reaction is performed while continuously adding monomer used in polymerization to a reaction system containing a polymerization initiator and a reducing agent in a dropwise manner from the start of the polymerization reaction until a freely selected period of time has elapsed. Moreover, it is more preferable that a polymerization reaction is performed while continuously adding each of monomer used in polymerization, a polymerization initiator, and a reducing agent to the polymerization reaction system in a dropwise manner from the start of the polymerization reaction until a freely selected period of time has elapsed. By performing a polymerization reaction while continuously adding these materials in a dropwise manner, emulsion polymerization can be stably performed, which enables improvement of the polymerization reaction rate. The polymerization is normally performed in a temperature range of not lower than 0° C. and not higher than 70° C., and preferably in a temperature range of not lower than 5° C. and not higher than 50° C.

Moreover, in a case in which a polymerization reaction is performed while continuously adding monomer used in polymerization in a dropwise manner, it is preferable that the monomer used in polymerization is mixed with an emulsifier and water such as to be in the form of a monomer emulsion and is then continuously added dropwise while in the form of a monomer emulsion. Although no specific limitations are placed on the method by which the monomer emulsion is produced, it may be a method in which all of the monomer used in polymerization, all of the emulsifier, and water are stirred using a stirrer such as a Homo Mixer or a disc turbine, for example. The amount of water that is used in the monomer emulsion per 100 parts by mass of all monomer used in polymerization is preferably not less than 10 parts by mass and not more than 70 parts by mass, and more preferably not less than 20 parts by mass and not more than 50 parts by mass.

Furthermore, in a case in which a polymerization reaction is performed while continuously adding each of monomer used in polymerization, a polymerization initiator, and a reducing agent to the polymerization reaction system in a dropwise manner from the start of the polymerization reaction until a freely selected period of time has elapsed, the monomer, the polymerization initiator, and the reducing agent may be added dropwise to the polymerization system from separate dripping devices to one another, or at least the polymerization initiator and the reducing agent may be premixed and may be added dropwise to the polymerization system from the same dripping device in the form of an aqueous solution as necessary. The reaction may be continued for a freely selected period of time after completion of the dropwise addition in order to improve the polymerization reaction rate.

<<Coagulation Step>>

In the coagulation step, a coagulant is added to the emulsion polymerization liquid that has been obtained in the emulsion polymerization step described above to cause coagulation of the acrylic polymer and obtain hydrous crumbs (coagulated material containing the acrylic polymer, coagulant, and water).

A metal salt having a valence of not less than 1 and not more than 3 such as previously described can suitably be used as the coagulant. The amount of the coagulant that is used per 100 parts by mass of the acrylic polymer in the emulsion polymerization liquid is preferably not less than 1 part by mass and not more than 20 parts by mass, and more preferably not less than 2 parts by mass and not more than 15 parts by mass from a viewpoint of causing the content (residual amount) of the coagulant in the finally obtained acrylic polymer to be within any of the previously described ranges.

The coagulation temperature is not specifically limited but is preferably not lower than 50° C. and not higher than 90° C., and more preferably not lower than 60° C. and not higher than 80° C.

<<Washing Step>>

In the washing step, the hydrous crumbs that have been obtained in the coagulation step described above are washed. By washing the hydrous crumbs, the residual amounts of components (coagulant, etc.) other than the acrylic polymer can be reduced.

The method of washing is not specifically limited and may be a method that uses water as a washing liquid and in which the hydrous crumbs are mixed with water that has been added thereto to perform water washing. The temperature during water washing is not specifically limited but is preferably not lower than 5° C. and not higher than 60° C., and more preferably not lower than 10° C. and not higher than 50° C. Moreover, the mixing time is not specifically limited but is preferably not less than 1 minute and not more than 60 minutes, and more preferably not less than 2 minutes and not more than 30 minutes.

Although no specific limitations are placed on the amount of water that is added to the hydrous crumbs in water washing, from a viewpoint that the content (residual amount) of the coagulant in the finally obtained binder composition can be effectively reduced, the amount of water that is added per 100 parts by mass of the acrylic polymer contained in the hydrous crumbs is preferably not less than 150 parts by mass and not more than 9,800 parts by mass, and more preferably not less than 150 parts by mass and not more than 1,800 parts by mass.

No specific limitations are placed on the number of water washes, and although washing may be performed just once, it is preferable that washing is performed not fewer than 2 times and not more than 10 times, and more preferably not fewer than 3 times and not more than 8 times from a viewpoint of reducing the content (residual amount) of the coagulant in the finally obtained binder composition. Note that although a larger number of water washes is desirable from a viewpoint of reducing the content (residual amount) of the coagulant in the finally obtained binder composition, performing washing in excess of any of the ranges set forth above only has a small effect in terms of removing the coagulant but has a significant influence on reducing production efficiency due to increasing the number of steps. Moreover, in order to further reduce the content (residual amount) of the coagulant, it is necessary to adopt a completely different step, such as a step in which coagulation is performed by a method that involves dissolution in an organic solvent such as toluene and then subsequent addition into methanol, for example. Therefore, it is preferable to adopt a coagulation and water washing scheme that enables good industrial production efficiency, and it is preferable that the number of water washes is within any of the ranges set forth above.

Furthermore, water washing in the washing step may be followed by acid washing using an acid as a washing liquid.

<<Drying Step>>

In the drying step, the hydrous crumbs that have undergone the washing step set forth above are dried to obtain a coagulated and dried material that contains the acrylic polymer and the coagulant.

Examples of drying methods that can be used in the drying step include, but are not specifically limited to, methods in which drying is performed using a dryer such as a screw-type extruder, a kneader-type dryer, an expander-dryer, a hot-air dryer, or a vacuum dryer. Moreover, a drying method that is a combination of these methods may be adopted. Furthermore, the hydrous crumbs may be subjected to separation by filtration using a sieve such as a rotary screen or a shaker screen; a centrifugal dehydrator; or the like, as necessary, prior to performing drying in the drying step.

The drying temperature in the drying step is not specifically limited and differs depending on the dryer used in drying. For example, in a case in which a hot-air dryer is used, the drying temperature is preferably not lower than 80° C. and not higher than 200° C., and more preferably not lower than 100° C. and not higher than 170° C.

<<Other Steps>>

No specific limitations are placed on other steps that can be included in the production method of the binder composition set forth above.

For example, the coagulated and dried material that is obtained in the drying step set forth above may be used in that form as the binder composition, or a step of adding an organic solvent to the coagulated and dried material (organic solvent addition step) may be performed after the drying step, and a liquid composition that contains the acrylic polymer, the coagulant, and the organic solvent may be used as the binder composition.

(Slurry Composition for all-Solid-State Secondary Battery)

The presently disclosed slurry composition contains a solid electrolyte and the organic solvent-containing binder composition set forth above. In other words, the presently disclosed slurry composition is a composition in which at least a solid electrolyte, the previously described acrylic polymer, and the previously described coagulant are dispersed and/or dissolved in an organic solvent.

As a result of the presently disclosed slurry composition being produced using the presently disclosed binder composition set forth above, it is possible to form a solid electrolyte-containing layer that can cause an all-solid-state secondary battery to display excellent high-temperature storage characteristics through the slurry composition.

Note that in a case in which the presently disclosed slurry composition for an all-solid-state secondary battery is to be used to form an electrode mixed material layer (i.e., in a case in which the slurry composition is a slurry composition for an all-solid-state secondary battery electrode), the presently disclosed slurry composition for an all-solid-state secondary battery normally contains at least a solid electrolyte, an electrode active material, an acrylic polymer, a coagulant, and an organic solvent.

Moreover, in a case in which the presently disclosed slurry composition for an all-solid-state secondary battery is to be used to form a solid electrolyte layer (i.e., in a case in which the slurry composition is a slurry composition for an all-solid-state secondary battery solid electrolyte layer), the presently disclosed slurry composition for an all-solid-state secondary battery normally contains at least a solid electrolyte, an acrylic polymer, a coagulant, and an organic solvent, and does not contain an electrode active material.

<Solid Electrolyte>

Although inorganic solid electrolytes and organic solid electrolytes can both be used as the solid electrolyte, an inorganic solid electrolyte can suitably be used.

The inorganic solid electrolyte may be a crystalline inorganic ion conductor, an amorphous inorganic ion conductor, or a mixture thereof without any specific limitations. In a case in which the all-solid-state secondary battery is an all-solid-state lithium ion secondary battery, for example, a crystalline inorganic lithium ion conductor, an amorphous inorganic lithium ion conductor, or a mixture thereof can normally be used as the inorganic solid electrolyte. In particular, the inorganic solid electrolyte preferably includes a sulfide inorganic solid electrolyte from a viewpoint of enhancing battery performance, such as high-temperature storage characteristics.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

Examples of crystalline inorganic lithium ion conductors include $Li_3N$, LISICON ($Li_{14}Zn(GeO_4)_4$), perovskite-type $Li_{0.5}La_{0.5}TiO_3$, garnet-type $Li_7La_3Zr_2O_{10}$, LIPON ($Li_{3+y}PO_{4-x}N_x$), and Thio-LISICON ($Li_{3.25}Ge_{0.25}P_{0.75}S_4$).

One of the crystalline inorganic lithium ion conductors described above may be used individually, or two or more of the crystalline inorganic lithium ion conductors may be used as a mixture.

The amorphous inorganic lithium ion conductor is not specifically limited so long as it contains a sulfur atom and displays ion conductivity and may be glass Li—Si—S—O, Li—P—S, or a product obtained using a raw material composition that contains $Li_2S$ and a sulfide of an element belonging to groups 13 to 15 of the periodic table.

The element belonging to groups 13 to 15 can be Al, Si, Ge, P, As, Sb, or the like, for example. More specifically, the sulfide of an element belonging to groups 13 to 15 may be $Al_2S_3$, $SiS_2$, $GeS_2$, $P_2S_3$, $P_2S_5$, $As_2S_3$, $Sb_2S_3$, or the like. The method by which an amorphous inorganic lithium ion conductor is synthesized using the raw material composition can be an amorphization method such as mechanical milling or melt quenching. The amorphous inorganic lithium ion conductor that is formed using a raw material composition containing $Li_2S$ and a sulfide of an element belonging to groups 13 to 15 of the periodic table is preferably $Li_2S$—$P_2S_5$, $Li_2S$—$SiS_2$, $Li_2S$—$GeS_2$, or $Li_2S$-$A_2S_3$, and more preferably $Li_2S$—$P_2S_5$.

One of the amorphous inorganic lithium ion conductors described above may be used individually, or two or more of the amorphous inorganic lithium ion conductors may be used as a mixture.

Of the inorganic solid electrolytes described above, an amorphous inorganic lithium ion conductor is preferable as an inorganic solid electrolyte for an all-solid-state lithium ion secondary battery from a viewpoint of enhancing battery performance, such as high-temperature storage characteristics, with an amorphous sulfide containing Li and P being more preferable. An amorphous sulfide containing Li and P has high lithium ion conductivity, and thus can reduce internal resistance and improve output characteristics of a battery in which the amorphous sulfide is used as an inorganic solid electrolyte.

The amorphous sulfide containing Li and P is more preferably sulfide glass formed of $Li_2S$ and $P_2S_5$ from a viewpoint of reducing internal resistance and improving output characteristics of a battery, with sulfide glass produced from a mixed raw material of $Li_2S$ and $P_2S_5$ in which the molar ratio of $Li_2S:P_2S_5$ is 65:35 to 85:15 being particularly preferable. Moreover, the amorphous sulfide containing Li and P is preferably sulfide glass-ceramic obtained by reacting a mixed raw material of $Li_2S$ and $P_2S_5$ in which the molar ratio of $Li_2S:P_2S_5$ is 65:35 to 85:15 by a mechanochemical method. From a viewpoint of maintaining a state of high lithium ion conductivity, the molar ratio of $Li_2S:P_2S_5$ in the mixed raw material is preferably 68:32 to 80:20.

Note that the inorganic solid electrolyte may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The addition of such a sulfide can stabilize a glass component in the inorganic solid electrolyte.

In the same manner, the inorganic solid electrolyte may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. The inclusion of such an ortho-oxoacid lithium salt can stabilize a glass component in the inorganic solid electrolyte.

<Acrylic Polymer>

The acrylic polymer is the acrylic polymer that was contained in the binder composition and, more specifically, can be any of the examples described above in the "Binder composition for all-solid-state secondary battery" section.

Note that in the slurry composition, a binder may be dissolved in the organic solvent or may be dispersed in a particulate form or the like, for example, without dissolving in the organic solvent.

The amount of the acrylic polymer that is contained in the slurry composition for an all-solid-state secondary battery is not specifically limited but is preferably 0.05 parts by mass or more, more preferably 0.1 parts by mass or more, and even more preferably 0.2 parts by mass or more per 100 parts by mass of the solid electrolyte, and is preferably 5 parts by mass or less, more preferably 3 parts by mass or less, and even more preferably 2 parts by mass or less per 100 parts by mass of the solid electrolyte. When the amount of the acrylic polymer is not less than any of the lower limits set forth above, a solid electrolyte-containing layer can be well formed. Moreover, when the amount of the acrylic polymer is not more than any of the upper limits set forth above, reduction of ion conductivity of a solid electrolyte-containing layer can be inhibited.

<Coagulant>

The coagulant is the coagulant that was contained in the binder composition and, more specifically, can be any of the examples described above in the "Binder composition for all-solid-state secondary battery" section.

Note that the content of the coagulant relative to the acrylic polymer in the presently disclosed slurry composition is the same as the content of the coagulant relative to the acrylic polymer in the presently disclosed binder composition set forth above because the coagulant originates from the binder composition as previously described.

<Organic Solvent>

The organic solvent can be any of the examples described above in the "Binder composition for all-solid-state secondary battery" section.

Note that the organic solvent contained in the slurry composition may be just organic solvent that was contained in the binder composition or may include organic solvent that was separately added during production of the slurry composition.

<Electrode Active Material>

The electrode active material is a material that gives and receives electrons in an electrode of an all-solid-state secondary battery. In a case in which the all-solid-state secondary battery is an all-solid-state lithium ion secondary battery, for example, the electrode active material is normally a material that can occlude and release lithium.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

A positive electrode active material for an all-solid-state lithium ion secondary battery may be a positive electrode active material formed of an inorganic compound or a positive electrode active material formed of an organic compound without any specific limitations. Also note that the positive electrode active material may be a mixture of an inorganic compound and an organic compound.

Examples of positive electrode active materials formed of inorganic compounds include transition metal oxides, complex oxides of lithium and a transition metal (lithium-containing complex metal oxides), and transition metal sulfides. The aforementioned transition metal may be Fe, Co, Ni, Mn, or the like. Specific examples of inorganic compounds that can be used as the positive electrode active material include lithium-containing complex metal oxides such as $LiCoO_2$ (lithium cobalt oxide), $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O-P_2O_5$, $MoO_3$, $V_2O_5$, and $V_6O_{13}$. These compounds may have undergone partial element substitution.

One of the positive electrode active materials formed of inorganic compounds described above may be used individually, or two or more of the positive electrode active materials formed of inorganic compounds may be used as a mixture.

Examples of positive electrode active materials formed of organic compounds include polyaniline, polypyrrole, polyacenes, disulfide compounds, polysulfide compounds, and N-fluoropyridinium salts.

One of the positive electrode active materials formed of organic compounds described above may be used individually, or two or more of the positive electrode active materials formed of organic compounds may be used as a mixture.

A negative electrode active material for an all-solid-state lithium ion secondary battery may be an allotrope of carbon such as graphite or coke. Note that a negative electrode active material formed of an allotrope of carbon can be used in a mixed or coated form with a metal, a metal salt, an oxide, or the like. Examples of negative electrode active materials that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

One of the negative electrode active materials described above may be used individually, or two or more of the negative electrode active materials described above may be used as a mixture.

<Optional Components>

The presently disclosed slurry composition may contain components other than the solid electrolyte, acrylic polymer, coagulant, organic solvent, and electrode active material described above.

Examples of such optional components include known binders other than the acrylic polymer, conductive materials, dispersants, leveling agents, defoamers, and reinforcing materials. In a case in which the all-solid-state secondary battery is an all-solid-state lithium ion secondary battery, for example, a lithium salt can be contained as another component. These other components are not specifically limited so long as they do not influence battery reactions.

Examples of known binders other than the acrylic polymer that can be used include macromolecular compounds such as fluoropolymers, diene polymers, and nitrile polymers. One of these macromolecular compounds may be used individually, or a plurality of these macromolecular compounds may be used in combination. Examples of fluoropolymers, diene polymers, and nitrile polymers that can be used include fluoropolymers, diene polymers, nitrile polymers, and so forth that are described in JP2012-243476A.

A conductive material is a material for ensuring electrical contact among an electrode active material in an electrode mixed material layer formed using the slurry composition for an all-solid-state secondary battery (i.e., a slurry composition for an all-solid-state secondary battery electrode). Examples of conductive materials that can be used include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals.

One of such conductive materials may be used individually, or two or more of such conductive materials may be used in combination.

Examples of lithium salts, dispersants, leveling agents, defoamers, and reinforcing materials that can be used include, but are not specifically limited to, those described in JP2012-243476A.

<Production Method of Slurry Composition>

Although no specific limitations are placed on the method by which the presently disclosed slurry composition set forth above is produced, the slurry composition can be obtained by mixing a binder composition produced by the procedure described above in the "Production method of binder composition" section, a solid electrolyte, and an electrode active material and optional components that are added as necessary, in the presence of an organic solvent.

(Solid Electrolyte-Containing Layer)

The presently disclosed solid electrolyte-containing layer is a layer that contains a solid electrolyte and may, for example, be an electrode mixed material layer (positive electrode mixed material layer or negative electrode mixed material layer) that gives and receives electrons through electrochemical reactions or a solid electrolyte layer that is provided between a positive electrode mixed material layer and a negative electrode mixed material layer that are in opposition to each other.

Moreover, the presently disclosed solid electrolyte-containing layer is a layer that is formed using the slurry composition for an all-solid-state secondary battery set forth above and can be formed by, for example, applying the slurry composition set forth above onto the surface of a suitable substrate to form a coating film, and then drying the coating film that is formed. In other words, the presently disclosed solid electrolyte-containing layer is formed of a dried product of the slurry composition set forth above and normally contains at least a solid electrolyte, an acrylic polymer, and a coagulant. Note that components contained in the solid electrolyte-containing layer are components that were contained in the slurry composition, and thus the content ratio of these components is normally the same as the content ratio thereof in the slurry composition.

The presently disclosed solid electrolyte-containing layer can cause an all-solid-state secondary battery to display excellent high-temperature storage characteristics as a result of being formed from the presently disclosed slurry composition for an all-solid-state secondary battery.

<Substrate>

No limitations are placed on the substrate onto which the slurry composition is applied. For example, a coating film of the slurry composition may be formed on the surface of a releasable substrate, the coating film may be dried to form a solid electrolyte-containing layer, and then the releasable substrate may be peeled from the solid electrolyte-containing layer. The solid electrolyte-containing layer that is peeled from the releasable substrate in this manner can be used as a free-standing film in formation of a battery member (for example, an electrode or a solid electrolyte layer) of an all-solid-state secondary battery.

However, it is preferable that a current collector or an electrode is used as the substrate from a viewpoint of increasing battery member production efficiency since a step of peeling the solid electrolyte-containing layer can be omitted. Specifically, the slurry composition is preferably applied onto a current collector serving as a substrate when an electrode mixed material layer is to be produced. Moreover, the slurry composition is preferably applied onto an electrode (positive electrode or negative electrode) when a solid electrolyte layer is to be produced.

<<Current Collector>>

The current collector is a material having electrical conductivity and electrochemical durability. Specifically, the current collector may, for example, be made of iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

<<Electrode>>

The electrode (positive electrode or negative electrode) is not specifically limited and may be an electrode that includes an electrode mixed material layer containing an electrode active material, a solid electrolyte, and a binder that is formed on a current collector such as described above.

Known electrode active materials, solid electrolytes, and binders can be used as the electrode active material, the solid electrolyte, and the binder that are contained in the electrode mixed material layer of the electrode without any specific limitations. Note that the electrode mixed material layer of the electrode may be a layer that corresponds to the presently disclosed solid electrolyte-containing layer.

<Formation Method of Solid Electrolyte-Containing Layer>

Examples of methods by which the solid electrolyte-containing layer may be formed on a substrate such as the current collector or electrode described above include:

(1) a method in which the presently disclosed slurry composition is applied onto the surface of a substrate (surface at the electrode mixed material layer side in the case of an electrode; same applies below) and is then dried;

(2) a method in which a substrate is immersed in the presently disclosed slurry composition and is then dried; and (3) a method in which the presently disclosed slurry composition is applied onto a releasable substrate and is dried to produce a solid electrolyte-containing layer that is then transferred onto the surface of an electrode or the like.

Of these methods, method (1) is particularly preferable since it allows simple control of the thickness of the solid electrolyte-containing layer. In more detail, method (1) includes a step of applying the slurry composition onto a substrate (application step) and a step of drying the slurry composition that has been applied onto the substrate to form a solid electrolyte-containing layer (solid electrolyte-containing layer formation step).

<<Application Step>>

Examples of methods by which the slurry composition may be applied onto the substrate in the application step include, but are not specifically limited to, methods such as doctor blading, reverse roll coating, direct roll coating, gravure coating, extrusion coating, and brush coating.

<<Solid Electrolyte-Containing Layer Formation Step>>

Commonly known methods can be adopted without any specific limitations as the method by which the slurry composition on the substrate is dried in the solid electrolyte-containing layer formation step. Examples of drying methods that may be used include drying by warm, hot, or low-humidity air, drying in a vacuum, and drying by irradiation with infrared light, electron beams, or the like.

Note that in a case in which the solid electrolyte-containing layer is an electrode mixed material layer, a pressing process is preferably performed by roll pressing or the like after drying. By performing a pressing process, the obtained electrode mixed material layer can be further densified.

(Electrode)

An electrode that is obtained by forming an electrode mixed material layer on a current collector using the presently disclosed slurry composition for an all-solid-state secondary battery includes an electrode mixed material layer that contains at least a solid electrolyte, an acrylic polymer, a coagulant, and an electrode active material and can cause an all-solid-state secondary battery to display excellent high-temperature storage characteristics.

(Solid Electrolyte Layer)

A solid electrolyte layer that is formed using the presently disclosed slurry composition for an all-solid-state secondary battery contains at least a solid electrolyte, an acrylic polymer, and a coagulant and can cause an all-solid-state secondary battery to display excellent high-temperature storage characteristics.

(All-Solid-State Secondary Battery)

The presently disclosed all-solid-state secondary battery normally includes a positive electrode, a solid electrolyte layer, and a negative electrode, and a feature thereof is that at least one of a positive electrode mixed material layer of the positive electrode, a negative electrode mixed material layer of the negative electrode, and the solid electrolyte layer is the presently disclosed solid electrolyte-containing layer. In other words, the presently disclosed all-solid-state secondary battery includes at least one of: a positive electrode including a positive electrode mixed material layer formed using a slurry composition for an all-solid-state secondary battery positive electrode serving as the presently disclosed slurry composition for an all-solid-state secondary battery; a negative electrode including a negative electrode mixed material layer formed using a slurry composition for an all-solid-state secondary battery negative electrode serving as the presently disclosed slurry composition for an all-solid-state secondary battery; and a solid electrolyte layer formed using a slurry composition for an all-solid-state secondary battery solid electrolyte layer serving as the presently disclosed slurry composition for an all-solid-state secondary battery.

The presently disclosed all-solid-state secondary battery has excellent battery performance, such as high-temperature storage characteristics, as a result of including the presently disclosed solid electrolyte-containing layer.

Note that any electrode for an all-solid-state secondary battery including an electrode mixed material layer that does not correspond to the presently disclosed solid electrolyte-containing layer can be used without any specific limitations in the presently disclosed all-solid-state secondary battery as an electrode for an all-solid-state secondary battery including an electrode mixed material layer that does not correspond to the presently disclosed solid electrolyte-containing layer.

Moreover, any solid electrolyte layer, such as a solid electrolyte layer described in JP2012-243476A, JP2013-143299A, or JP2016-143614A, for example, can be used without any specific limitations in the presently disclosed all-solid-state secondary battery as a solid electrolyte layer that does not correspond to the presently disclosed solid electrolyte-containing layer.

The presently disclosed all-solid-state secondary battery can be obtained by stacking the positive electrode and the negative electrode such that the positive electrode mixed material layer of the positive electrode and the negative electrode mixed material layer of the negative electrode are in opposition via the solid electrolyte layer and optionally performing pressing thereof to obtain a laminate, subsequently placing the laminate in a battery container in that form or after rolling, folding, or the like, depending on the battery shape, and then sealing the battery container. Note that pressure increase inside the battery and the occurrence of overcharging or overdischarging can be prevented by placing an expanded metal, an overcurrent preventing device such as a fuse or a PTC device, a lead plate, or the like in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative examples, the following methods were used to measure and evaluate the content of a coagulant in a binder composition, the recovery rate of an acrylic polymer, and the high-temperature storage characteristics of an all-solid-state secondary battery.

<Content of Coagulant>

Elemental analysis of a binder composition (coagulated and dried material) was performed by inductively coupled plasma atomic emission spectroscopy (ICP-AES) to measure the content of a coagulant in the coagulated and dried material. Specifically, elemental analysis was performed to determine the proportional content of a constituent element of a used coagulant in the binder composition, and then the content of the coagulant was calculated from the determined proportional content.

<Recovery Rate of Acrylic Polymer>

The amount of an acrylic polymer that could be recovered as a binder composition was calculated as a proportion relative to the theoretical yield assumed from the total amount of charged monomers and the polymerization conversion rate, and this proportion was taken to be the recovery rate (%).

<High-Temperature Storage Characteristics>

The capacity of a produced all-solid-state secondary battery was measured and was taken to be the initial capacity $C_0$. Next, the capacity $C_{100}$ after 100 hours of storage in an 80° C. thermostatic tank, the capacity $C_{500}$ after 500 hours of storage in an 80° C. thermostatic tank, and the capacity $C_{1000}$ after 1,000 hours of storage in an 80° C. thermostatic tank were each measured for the all-solid-state secondary battery after the initial capacity thereof had been measured. A capacity maintenance rate for the all-solid-state secondary battery after each of these storage times had elapsed ($C_{100}/C_0 \times 100\%$; $C_{500}/C_0 \times 100\%$; $C_{1000}/C_0 \times 100\%$) was calculated. A higher capacity maintenance rate indicates that the all-solid-state secondary battery has better high-temperature storage characteristics.

Note that the capacity of the all-solid-state secondary battery was measured as follows.

The all-solid-state secondary battery was subjected to charge/discharge cycling at 25° C. in which the all-solid-state secondary battery was charged to 4.2 V with a constant current and subsequently charged with a constant voltage by a 0.1 C constant current-constant voltage charging method, and was then discharged to 3.0 V with a 0.1 C constant current. Five charge/discharge cycles were performed, and the discharge capacity of the 5th cycle was taken to be the capacity.

Example 1

<Production of Binder Composition>
<<Emulsion Polymerization Step>>

A mixing vessel including a Homo Mixer was charged with 47.701 parts of pure water, 49.3 parts of ethyl acrylate and 49.3 parts of n-butyl acrylate as (meth)acrylic acid ester monomers (proportions among all monomers: 50% ethyl acrylate and 50% n-butyl acrylate), 0.709 parts of sodium lauryl sulfate (product name: EMAL 2FG; produced by Kao Corporation) as an anionic surfactant, and 1.82 parts of polyoxyethylene dodecyl ether (product name: EMULGEN 105; produced by Kao Corporation) as a non-ionic surfactant, and these materials were stirred to obtain a monomer emulsion.

Next, 170.853 parts of pure water and 2.98 parts of the monomer emulsion obtained as described above were loaded into a polymerization reaction tank including a thermometer and a stirrer, and were cooled to a temperature of 12° C. under a stream of nitrogen. Thereafter, 145.85 parts of the monomer emulsion obtained as described above, 0.00033 parts of ferrous sulfate and 0.264 parts of sodium ascorbate as reducing agents, and 7.72 parts of a 2.85% potassium persulfate aqueous solution (0.22 parts in terms of potassium persulfate) as a polymerization initiator were continuously added dropwise into the polymerization reaction tank over 3 hours. The reaction was then continued for 1 hour in a state in which the internal temperature of the polymerization reaction tank was held at 23° C., and once the polymerization conversion rate was confirmed to have reached 95%, the polymerization reaction was ended through addition of hydroquinone as a polymerization inhibitor to yield an emulsion polymerization liquid.

<<Coagulation Step>>

The emulsion polymerization liquid obtained in the emulsion polymerization step was transferred to a coagulation tank, and 60 parts of industrial water was added to 100 parts of the emulsion polymerization liquid to obtain a mixture. The mixture was heated to 85° C. and was then stirred at a temperature of 85° C. while 3.3 parts of sodium sulfate (11 parts per 100 parts of acrylic polymer contained in mixture) as a coagulant was continuously added thereto to cause coagulation of the acrylic polymer and obtain hydrous crumbs of the acrylic polymer.

<<Washing Step>>

After adding 160 parts of industrial water relative to 100 parts of solid content of the hydrous crumbs obtained in the coagulation step, 5 minutes of stirring was performed at 15° C. inside the coagulation tank, and then water was discharged from the coagulation tank to perform water washing of the hydrous crumbs. This water washing was repeated four times in total.

<<Drying Step>>

The hydrous crumbs that had undergone water washing in the washing step were then dried at 110° C. for 1 hour in a hot-air dryer to obtain a coagulated and dried material. This coagulated and dried material (binder composition) was used to measure the content of the coagulant and the recovery rate of the acrylic polymer. The results are shown in Table 1. The acrylic polymer was confirmed to include 50% of ethyl acrylate units and 50% of n-butyl acrylate units by NMR measurement. Note that the proportion constituted by each monomer among all monomers used to produce an acrylic polymer was confirmed to be the same as the proportion constituted by monomer units derived from that monomer in the acrylic polymer for each of the other examples and comparative examples.

<<Organic Solvent Addition Step>>

The coagulated and dried material obtained in the drying step was dissolved in xylene and was subsequently treated through heating under reduced pressure using an evaporator to produce a liquid composition (water content: 82 mass ppm; solid content concentration: 7%) as a binder composition.

<Production of Slurry Composition for Solid Electrolyte Layer>

In a glove box under an argon gas atmosphere (water concentration: 0.6 mass ppm; oxygen concentration: 1.8 mass ppm), 100 parts of sulfide glass formed of $Li_2S$ and $P_2S_5$ ($Li_2S/P_2S_5$=70 mol %/30 mol %; number-average particle diameter: 1.2 μm; D90: 2.1 μm) as a solid electrolyte and 2 parts (in terms of solid content) of the binder composition obtained as described above were mixed, xylene was further added as an organic solvent, and the solid content concentration was adjusted to 65 mass %. Mixing was subsequently performed by a planetary mixer to produce a slurry composition for a solid electrolyte layer.

<Production of Slurry Composition for Positive Electrode>

After mixing 100 parts of lithium cobalt oxide (average particle diameter: 11.5 μm) as a positive electrode active material, 150 parts of sulfide glass formed of $Li_2S$ and $P_2S_5$ ($Li_2S/P_2S_5$=70 mol %/30 mol %; number-average particle diameter: 0.4 μm) as a solid electrolyte, 13 parts of acetylene black as a conductive agent, and 2 parts (in terms of solid content) of the binder composition obtained as described above, further adding xylene as an organic solvent, and adjusting the solid content concentration to 78%, 60 minutes of mixing was performed by a planetary mixer. Thereafter, the solid content concentration was further adjusted to 74% with xylene and a further 10 minutes of mixing was subsequently performed to produce a slurry composition for a positive electrode.

<Production of Slurry Composition for Negative Electrode>

After mixing 100 parts of graphite (average particle diameter: 20 μm) as a negative electrode active material, 50 parts of sulfide glass formed of $Li_2S$ and $P_2S_5$ ($Li_2S/P_2S_5$=70 mol %/30 mol %; number-average particle diameter: 0.4 μm) as a solid electrolyte, and 2 parts (in terms of solid content) of the binder composition obtained as described above, further adding xylene as an organic solvent, and adjusting the solid content concentration to 60%, mixing was performed by a planetary mixer to produce a slurry composition for a negative electrode.

<Production of all-Solid-State Secondary Battery>

The slurry composition for a positive electrode was applied onto the surface of a current collector (aluminum foil; thickness: 20 μm) and was dried (110° C., 20 minutes) to form a positive electrode mixed material layer of 50 μm in thickness and thereby obtain a positive electrode. In addition, the slurry composition for a negative electrode was applied onto the surface of a separate current collector (copper foil; thickness: 18 μm) and was dried (110° C., 20 minutes) to form a negative electrode mixed material layer of 30 μm in thickness and thereby obtain a negative electrode.

Next, the slurry composition for a solid electrolyte layer was applied onto the positive electrode mixed material layer surface of the positive electrode and was dried (110° C., 10 minutes) to form a solid electrolyte layer of 18 μm in thickness and thereby obtain a solid electrolyte layer-equipped positive electrode.

The solid electrolyte layer-equipped positive electrode and the negative electrode were affixed with the solid electrolyte layer of the solid electrolyte layer-equipped positive electrode and the negative electrode mixed material layer of the negative electrode in contact and were then pressed to obtain an all-solid-state secondary battery. The thickness of the solid electrolyte layer in the all-solid-state secondary battery after pressing was 11 μm. High-temperature storage characteristics were evaluated for this all-solid-state secondary battery. The results are shown in Table 1.

Example 2

A binder composition (water content: 75 mass ppm; solid content concentration: 7.5%), various slurry compositions, and an all-solid-state secondary battery were produced, and measurements and evaluations were performed in the same way as in Example 1 with the exception that in production of the binder composition, 2-ethylhexyl acrylate was also used as a monomer (proportions among all monomers: 48% ethyl acrylate, 45% n-butyl acrylate, 7% 2-ethylhexyl acrylate) in the emulsion polymerization step, magnesium sulfate was used instead of sodium sulfate as a coagulant in the coagulation step, and the amount of industrial water that was added in the washing step was changed to 150 parts. The results are shown in Table 1.

Example 3

A binder composition (water content: 58 mass ppm; solid content concentration: 7.5%), various slurry compositions, and an all-solid-state secondary battery were produced, and measurements and evaluations were performed in the same way as in Example 1 with the exception that in production of the binder composition, the number of water washes in the washing step was changed to one. The results are shown in Table 1.

Example 4

A binder composition (water content: 88 mass ppm; solid content concentration: 7.2%), various slurry compositions, and an all-solid-state secondary battery were produced, and measurements and evaluations were performed in the same way as in Example 1 with the exception that in production of the binder composition, the amounts of ethyl acrylate and n-butyl acrylate used as monomers in the emulsion polymerization step were changed such that the proportions thereof among all monomers were 55% and 45%, respectively, the amount of sodium sulfate used as a coagulant in the coagulation step was changed to 1.2 parts, and the amount of industrial water that was added in the washing step was changed to 200 parts. The results are shown in Table 1.

Example 5

A binder composition (water content: 95 mass ppm; solid content concentration: 8.2%), various slurry compositions, and an all-solid-state secondary battery were produced, and measurements and evaluations were performed in the same way as in Example 1 with the exception that diisobutyl ketone was used instead of xylene in production of the binder composition, the slurry composition for a solid electrolyte layer, the slurry composition for a positive electrode, and the slurry composition for a negative electrode. The results are shown in Table 2.

Example 6

A binder composition (water content: 48 mass ppm; solid content concentration: 7.5%), various slurry compositions, and an all-solid-state secondary battery were produced, and measurements and evaluations were performed in the same way as in Example 1 with the exception that n-butyl ether was used instead of xylene in production of the binder composition, the slurry composition for a solid electrolyte layer, the slurry composition for a positive electrode, and the slurry composition for a negative electrode. The results are shown in Table 2.

Comparative Example 1

A binder composition (water content: 68 mass ppm; solid content concentration: 7.4%), various slurry compositions, and an all-solid-state secondary battery were produced, and measurements and evaluations were performed in the same way as in Example 1 with the exception that in production of the binder composition, the amount of sodium sulfate used as a coagulant in the coagulation step was changed to 15 parts. The results are shown in Table 2.

Comparative Example 2

A binder composition (water content: 58 mass ppm; solid content concentration: 7.5%), various slurry compositions, and an all-solid-state secondary battery were produced, and measurements and evaluations were performed in the same way as in Example 1 with the exception that in production of the binder composition, the washing step was not performed, and the hydrous crumbs obtained in the coagulation step were subjected to the drying step in that form. The results are shown in Table 2.

Comparative Example 3

A binder composition (water content: 86 mass ppm; solid content concentration: 7.6%) was produced in the same way as in Example 1 with the exception that the amount of sodium sulfate used as a coagulant in the coagulation step in production of the binder composition was changed to 0.1 parts, but the recovery rate of an acrylic polymer was extremely low (45%) due to insufficient coagulation resulting from deficiency of the coagulant, and thus various slurry compositions and an all-solid-state secondary battery were not produced.

In Tables 1 and 2, shown below:
"XY" indicates xylene;
"DIK" indicates diisobutyl ketone; and
"BE" indicates n-butyl ether.

It can be seen from Tables 1 and 2 that an all-solid-state secondary battery having excellent high-temperature storage characteristics was obtained in each of Examples 1 to 6 in which a solid electrolyte-containing layer was produced using a binder composition that contained an acrylic polymer and a coagulant and had a coagulant content within a specific range.

On the other hand, it can be seen from Table 2 that high-temperature storage characteristics of an all-solid-state secondary battery were lost in each of Comparative Examples 1 and 2 in which a solid electrolyte-containing layer was produced using a binder composition having a coagulant content that exceeded a specific upper limit.

It can also be seen from Table 2 that the recovery rate of an acrylic polymer significantly decreased as previously described in Comparative Example 3 in which the content of a coagulant in a binder composition was lower than a specific lower limit as a result of the amount of the coagulant used in production of the binder composition being reduced.

TABLE 1

| | | | Example | Example 2 | Example 3 | Example 4 |
|---|---|---|---|---|---|---|
| Emulsion polymerization step | Monomers | Ethyl acrylate [mass %] | 50 | 48 | 50 | 55 |
| | | n-Butyl acrylate [mass %] | 50 | 45 | 50 | 45 |
| | | 2-Ethylhexyl acrylate [mass %] | — | 7 | — | — |
| | Emulsifier | Sodium lauryl sulfate [parts by mass] | 0.709 | 0.709 | 0.709 | 0.709 |
| | | Polyoxyethylene dodecyl ether [parts by mass] | 1.82 | 1.82 | 1.82 | 1.82 |
| | Initiator | Potassium persulfate [parts by mass] | 0.22 | 0.22 | 0.22 | 0.22 |
| Coagulation step | Coagulant | Sodium sulfate [parts by mass (per 100 parts of emulsion polymerization liquid)] | 3.3 | — | 3.3 | 1.2 |
| | | Magnesium sulfate [parts by mass (per 100 parts of emulsion polymerization liquid)] | — | 3.3 | — | — |
| Washing step | | Industrial water [parts by mass (per 100 parts of hydrous crumbs)] | 160 | 150 | 160 | 200 |
| | | Number of washes [times] | 4 | 4 | 1 | 4 |
| Binder composition | | Recovery rate of acrylic polymer [mass %] | 100 | 100 | 100 | 94 |
| | | Content of coagulant [mass ppm] | 2800 | 3100 | 4300 | 860 |
| | | Organic solvent | XY | XY | XY | XY |
| All-solid-state secondary battery | | Initial capacity [mAh] | 5.5 | 5.8 | 5.5 | 5.6 |
| | High-temperature storage characteristics | Capacity maintenance rate (100 h) [%] | 95 | 93 | 88 | 94 |
| | | Capacity maintenance rate (500 h) [%] | 85 | 82 | 79 | 82 |
| | | Capacity maintenance rate (1000 h) [%] | 71 | 73 | 68 | 72 |

TABLE 2

| | | | Example 5 | Example 6 | Comparative Example 1 | Comparative Example 2 | Comparative Example 3 |
|---|---|---|---|---|---|---|---|
| Emulsion polymerization step | Monomers | Ethyl acrylate [mass %] | 50 | 50 | 50 | 50 | 50 |
| | | n-Butyl acrylate [mass %] | 50 | 50 | 50 | 50 | 50 |
| | | 2-Ethylhexyl acrylate [mass %] | — | — | — | — | — |
| | Emulsifier | Sodium lauryl sulfate [parts by mass] | 0.709 | 0.709 | 0.709 | 0.709 | 0.709 |
| | | Polyoxyethylene dodecyl ether [parts by mass] | 1.82 | 1.82 | 1.82 | 1.82 | 1.82 |
| | Initiator | Potassium persulfate [parts by mass] | 0.22 | 0.22 | 0.22 | 0.22 | 0.22 |
| Coagulation step | Coagulant | Sodium sulfate [parts by mass (per 100 parts of emulsion polymerization liquid)] | 3.3 | — | 15 | 3.3 | 0.1 |
| | | Magnesium sulfate [parts by mass (per 100 parts of emulsion polymerization liquid)] | — | — | — | — | — |
| Washing step | | Industrial water [parts by mass (per 100 parts of hydrous crumbs)] | 160 | 160 | 160 | — | 160 |
| | | Number of washes [times] | 4 | 4 | 4 | — | 4 |
| Binder composition | | Recovery rate of acrylic polymer [mass %] | 100 | 100 | 100 | 100 | 45 |
| | | Content of coagulant [mass ppm] | 2800 | 2800 | 11500 | 8000 | 395 |
| | | Organic solvent | DIK | BE | XY | XY | XY |
| All-solid-state secondary battery | | Initial capacity [mAh] | 5.5 | 5.5 | 5.5 | 5.5 | — |
| | High-temperature storage characteristics | Capacity maintenance rate (100 h) [%] | 85 | 80 | 65 | 72 | — |
| | | Capacity maintenance rate (500 h) [%] | 75 | 72 | 54 | 65 | — |
| | | Capacity maintenance rate (1000 h) [%] | 60 | 65 | 50 | 58 | — |

INDUSTRIAL APPLICABILITY

According to the present disclosure, it is possible to provide a binder composition for an all-solid-state secondary battery and a slurry composition for an all-solid-state secondary battery with which it is possible to form a solid electrolyte-containing layer that can cause an all-solid-state secondary battery to display excellent high-temperature storage characteristics.

Moreover, according to the present disclosure, it is possible to provide a solid electrolyte-containing layer that can cause an all-solid-state secondary battery to display excellent high-temperature storage characteristics and an all-solid-state secondary battery that has excellent high-temperature storage characteristics.

The invention claimed is:

1. A binder composition for an all-solid-state secondary battery comprising: an acrylic polymer; and not less than 500 mass ppm and not more than 5,000 mass ppm of a coagulant relative to the acrylic polymer, wherein the coagulant is a metal salt having a valence of not less than 1 and not more than 3.

2. The binder composition for an all-solid-state secondary battery according to claim 1, wherein the coagulant is a metal sulfate having a valence of not less than 1 and not more than 3.

3. The binder composition for an all-solid-state secondary battery according to claim 1, wherein the acrylic polymer is an emulsion polymer.

4. The binder composition for an all-solid-state secondary battery according to claim 1, further comprising an organic solvent.

5. A slurry composition for an all-solid-state secondary battery comprising: a solid electrolyte; and the binder composition for an all-solid-state secondary battery according to claim 4.

6. The slurry composition for an all-solid-state secondary battery according to claim 5, wherein the solid electrolyte is an inorganic solid electrolyte.

7. The slurry composition for an all-solid-state secondary battery according to claim 5, further comprising an electrode active material.

8. A solid electrolyte-containing layer formed using the slurry composition for an all-solid-state secondary battery according to claim 5.

9. An all-solid-state secondary battery comprising the solid electrolyte-containing layer according to claim 8.

* * * * *